United States Patent
Huang et al.

(10) Patent No.: US 8,399,124 B2
(45) Date of Patent: Mar. 19, 2013

(54) VAPOR TRANSMISSION RESISTANT SEAL MEMBERS FOR NONAQUEOUS ELECTROCHEMICAL CELLS

(75) Inventors: Weiwei Huang, Westlake, OH (US); James X. Wu, North Olmsted, OH (US); James J. Mieskoski, Westlake, OH (US); Paula J. Hughes, Cleveland Heights, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 390 days.

(21) Appl. No.: 12/665,380

(22) PCT Filed: Jun. 26, 2008

(86) PCT No.: PCT/US2008/007939
§ 371 (c)(1),
(2), (4) Date: Jun. 14, 2010

(87) PCT Pub. No.: WO2009/020499
PCT Pub. Date: Feb. 12, 2009

(65) Prior Publication Data
US 2010/0248014 A1   Sep. 30, 2010

Related U.S. Application Data

(60) Provisional application No. 60/937,891, filed on Jun. 29, 2007.

(51) Int. Cl.
*H01M 8/02* (2006.01)
(52) U.S. Cl. ............ 429/174; 429/181; 429/184; 429/53
(58) Field of Classification Search .................. 429/174, 429/181, 184, 53
See application file for complete search history.

(56) References Cited

U.S. PATENT DOCUMENTS

| | | | |
|---|---|---|---|
| 4,282,293 | A | 8/1981 | van Lier |
| 4,329,405 | A | 5/1982 | Zupancic |
| 4,437,231 | A | 3/1984 | Zupancic |
| 4,529,673 | A | 7/1985 | Zupancic |
| 4,592,970 | A | 6/1986 | Zupancic |
| 4,931,368 | A | 6/1990 | Ayers et al. |
| 5,015,542 | A | 5/1991 | Chaney et al. |
| RE35,746 | E | 3/1998 | Lake |
| 6,579,643 | B1 | 6/2003 | Gozdz |
| 2005/0053832 | A1 | 3/2005 | Ray et al. |

(Continued)

FOREIGN PATENT DOCUMENTS

| | | |
|---|---|---|
| JP | 58-087755 A | 5/1983 |
| JP | 60-182656 A | 9/1985 |

(Continued)

OTHER PUBLICATIONS

Patent Cooperation Treaty (PCT), International Search Report and Written Opinion for Application No. PCT/US2008/07939, filed Jun. 26, 2008, mailed Sep. 8, 2008, United States Patent and Trademark Office, U.S.

(Continued)

*Primary Examiner* — Jane Rhee
(74) *Attorney, Agent, or Firm* — Robert C. Baraona

(57) ABSTRACT

A seal member having a thermoplastic body for an electrochemical cell containing a nonaqueous organic solvent electrolyte. In particular, the seal member is preferably one or more of (a) a seal located between a cell container wall and a cell cover and (b) a seal of a vent assembly, more particularly a ball vent assembly. The seal member has a composite construction including one or more vapor transmission barrier layers disposed on a portion of the thermoplastic body.

18 Claims, 3 Drawing Sheets

U.S. PATENT DOCUMENTS

| | | |
|---|---|---|
| 2005/0079404 A1 | 4/2005 | Schubert et al. |
| 2005/0079413 A1 | 4/2005 | Schubert et al. |
| 2005/0112462 A1 | 5/2005 | Marple |
| 2005/0233214 A1 | 10/2005 | Marple et al. |
| 2005/0244706 A1 | 11/2005 | Wu et al. |

FOREIGN PATENT DOCUMENTS

| | | |
|---|---|---|
| JP | 09-035694 A | 2/1997 |
| JP | 2002-198019 A | 7/2002 |

OTHER PUBLICATIONS

US 4,927,720, 05/1990, Chaney et al. (withdrawn)

VAPOR TRANSMISSION RESISTANT SEAL MEMBERS FOR NONAQUEOUS ELECTROCHEMICAL CELLS

CROSS REFERENCE

This application claims the benefit of priority under 35 U.S.C. §119 of U.S. Provisional Application Ser. No. 60/937,891 filed on Jun. 29, 2007.

FIELD OF THE INVENTION

The present invention relates to an improved seal member having a thermoplastic body for an electrochemical cell containing a nonaqueous organic solvent electrolyte. In particular, the seal member is preferably one or more of (a) a seal located between a cell container wall and a cell cover and (b) a seal of a vent assembly, more particularly a ball vent assembly. The seal member has a composite construction including one or more vapor transmission barrier layers disposed at least on a portion of the thermoplastic body.

BACKGROUND OF THE INVENTION

Electrochemical cells including a nonaqueous electrolyte are substantially free of water. The cell electrode materials and electrolyte are carefully manufactured, dried and stored prior to cell manufacturing to maintain the amount of water in those components at typically no more than tens or hundreds of parts per million. Manufacturing processes in which cell internal components are exposed to the air are generally performed in a dry box or a dry room. These measures are necessary because of the high reactivity of one or more of the cell ingredients with water. Organic solvents or solutions are often used as electrolytes in nonaqueous cells. Examples of nonaqueous cells that contain such organic solvents include lithium and lithium ion cells, although other types of nonaqueous cells, containing other materials that are highly reactive with water, are known.

Batteries containing nonaqueous cells are becoming increasingly popular as power sources for electronic devices. Though they are often more costly than common aqueous cells, nonaqueous cells can have many advantages because of the natures of materials used. These advantages include high energy density, high capacity at low temperatures, low weight and excellent shelf life over a broad range of temperatures. Many nonaqueous cells also have high electrode interfacial surface area designs that make them especially well suited for high power (including high current and low resistance) discharge, and the general trend in power requirements for electronic devices has been toward higher and higher power. Some of the types of devices for which high capacity on high power discharge is particularly important include photoflash devices (flash units and cameras with internal flash capability), digital still cameras, video cameras, personal digital assistant devices and portable computers.

The electrolytes comprising organic solvents or solutions utilized in nonaqueous cells in some embodiments have relatively low boiling points and thus relatively high vapor pressures within the cell at normal operating and/or storage temperatures. It is, therefore, a requirement for the cell to be sealed properly to resist leakage of liquid electrolyte as well as resist transmission of electrolyte vapor or gas from within the cell to a location outside the cell.

A wide variety of cell designs have been used for nonaqueous cells. The type of design is dependent in part on the size of the cell, the type of electrode and electrolyte materials used in the cell and the power requirements of the devices to be powered by the cell. Because the cathode/electrolyte materials are so reactive, the designs for large liquid cathode lithium cells (e.g., lithium-sulfur dioxide ($Li/SO_2$) and lithium-thionyl chloride ($Li/SOCl_2$)) often have housings in which metal components are hermetically welded, and glass seals are used to seal metal components that must be electrically insulated and to seal small apertures in the housings. These types of housings tend to be expensive due to the materials and the manufacturing processes and equipment required.

Other means can be used to seal the cells. Because of the relatively low cost and ease of manufacture, it can be desirable to use thermoplastic seal members between rigid housing components. For example, a thermoplastic gasket or grommet can be compressed between the inside top edge of the cell container (e.g., a steel can) and the periphery of the cell cover closing the open top of the can, forming a seal to keep the electrolyte within the cell housing and to keep water out.

A thermoplastic seal member can also be used to seal an aperture in the cell housing. For example, the thermoplastic seal member may be in the form of a plug sealing a small hole in the cell cover. Electrolyte may be dispensed into the cell after the cover has been assembled to the can. In another example, the plug may be a rigid material, such as a glass or metal ball, with a thermoplastic seal member in the form of a bushing between the inner surface of the aperture and the ball. In these examples, the thermoplastic plug or the ball and bushing may also function as a pressure relief vent for the cell.

Cylindrical lithium cell designs have been used for $Li/FeS_2$ and other lithium cell types that include two thermoplastic seal members—a gasket sealing a cover in the open end of the can and a bushing sealing an aperture in the cell cover. Both thermoplastic seal members provide a compressive seal. Since the can and cover are electrically connected to opposite electrodes within the cell, the gasket also provides the necessary electrical insulation. The bushing and a vent ball comprise a pressure relief vent for the cell. When the internal cell pressure exceeds a predetermined abnormally high level, the vent ball, or the ball and bushing, are forced out of the cover, leaving an opening through which pressure is released. Cells sealed with both a gasket between the can and cover and a pressure relief vent comprising a bushing and vent plug disposed in an aperture in the cell cover are disclosed in U.S. Pat. No. 4,329,405 (issued May 11, 1982), U.S. Pat. No. 4,437,231 (issued Mar. 20, 1984), U.S. Pat. No. 4,529,673 (issued Jul. 16, 1985), U.S. Pat. No. 4,592,970 (issued Jun. 3, 1986), U.S. Pat. No. 4,927,720 (issued May 22, 1990), U.S. Pat. No. 4,931,368 (issued Jun. 5, 1990) and U.S. Pat. No. 5,015,542 (issued May 14, 1991), the entire disclosures of which are incorporated herein by reference.

Thermoplastic seal members are also used in other types of cells, including aqueous electrolyte cells such as common consumer type aqueous zinc-manganese dioxide ($Zn/MnO_2$), nickel-cadmium (Ni/Cd) and nickel-metal hydride (NiMH) cells.

For any cell type, the seal member material and design must be such that a suitable seal is maintained for an acceptable period of time and under the temperature conditions that the cell is expected to withstand during transportation, storage and use. Common characteristics of a good seal member include stability of the material in the internal cell and external environments, impermeability to the liquids and gases that are to be sealed within or outside the cell, and the formation and maintenance of a complete seal path (i.e., with no voids or gaps) at each seal interface.

For thermoplastic seal members which form a compressive seal, the seal member must be sufficiently compressed to achieve a good seal, and sufficient compression must be maintained for the desired time. Thermoplastic materials under compressive stress tend to move to relieve that stress. This is referred to as stress relaxation or cold flow of the material. Thermoplastic materials tend to stress relax more at higher temperatures, thereby reducing the time that sufficient compression can be maintained. Temperature also affects the compression of thermoplastic seal members in another way. Different materials will expand and contract by different amounts in response to increases and decreases, respectively, in ambient temperature. In a cell with a thermoplastic seal member forming a compressive seal between more rigid components (e.g., a metal can and a metal cover), it is generally desirable for the gasket and rigid components being sealed to expand at close to the same rate in order to maintain sufficient gasket compression over the greatest temperature range possible.

Thermoplastic materials and seal designs suitable for nonaqueous cell seal members are more limited than for aqueous cell seal members. The seal members must have a higher degree of impermeability to water because active materials in the cell are very reactive therewith, and some common materials for aqueous cell seal members are not suitable. Nonaqueous cell seal members must also have a low vapor transmission rate for the electrolyte solvents. Since the vapor transmission rates of thermoplastic materials are generally dependent in part upon the vapor pressure of the solvent, low vapor transmission rates are generally more difficult to achieve for nonaqueous cells whose electrolytes contain ethers or other organic solvents or compounds with low boiling points. The greater the ratio of the effective area of the seal member exposed to the internal volume of the cell, the more important the electrolyte solvent and water transmission rates.

Polypropylene is commonly used as a material for lithium cell (e.g., Li/MnO$_2$ and Li/FeS$_2$) gasket seal members. Gaskets have been made with other thermoplastic materials for the purpose of improving the ability of the cell to withstand high temperatures than with polypropylene.

U.S. Pat. No. 4,282,293 discloses a seal for alkaline cells comprising a gasket having a coated layer of a polyamide, an epoxy resin, asphalt or a cured epoxy-polyamide resin and a film of a substituted organosilane disposed and compressed between the interface of the cell's cover and the coated gasket of the cell thereby reportedly providing a fluid-tight seal therebetween.

Reissued U.S. Pat. No. RE 35,746 discloses a battery package for a thin battery including a flexible base film that covers and encloses the battery and a flexible layer of an inorganic material such as silicon nitride, aluminum nitride or aluminum oxide deposited on the base film to reportedly encapsulate and seal the battery. The base film is formed of a flexible polymer material such as polyester that may be attached to the battery using a heat activated adhesive. The layer of inorganic material is deposited on the base film utilizing a low temperature CVD deposition process either before or after the base film is attached to the battery.

U.S. Patent Application Publication No. 2005/0079404 discloses an electrochemical battery cell with an aperture in the container or cell cover having the aperture sealed by an improved thermoplastic sealing member, which forms at least a part of the cell's pressure relief vent and is made from a material comprising a thermoplastic resin and more than 10 weight percent of a thermal-stabilizing filler, to provide an effective seal and a reliable pressure relief vent over a broad temperature range.

U.S. Patent Application Publication No. 2005/0079413 discloses an electrochemical battery cell with an improved thermoplastic sealing member. The seal member is made from a thermoplastic resin comprising polyphthalamide or impact modified polyphenylene sulfide. The seal member reportedly provides an effective seal vent over a broad temperature range and has a low electrolyte vapor transmission rate.

Japanese Publication No. 58-087755 relates to reportedly preventing electrolyte moving up to the outer surface of the battery through the surface of a negative can due to electric capillarity, by the sealing effect of a magnetic field, with the entire contact surfaces of an insulating gasket, a positive can and the negative can, without using any permanent magnetic ring. The magnetic fluid used in the example is a colloidal solution prepared by dispersing magnetite particles which have diameters of 100-200 Angstrom and are coated with oleic acid in carbon fluoride solvent by use of a nonionic surfactant; here, an electrolyte-resistant solvent is selectively used. Since the insulating gasket also serves as a magnet, the thin layer of the magnetic fluid reportedly intensely adheres to the surface of the gasket due to its magnetic force, which prevents any fluid from flowing out of the battery. Thus, a liquid sealing between the positive cap and the negative can is reportedly enabled.

Japanese Publication No. 60-182656 relates to an insulating film of metal oxide, such as alumina or chromate, formed on the surface, which is to be in contact with a gasket of an anode can by vapor deposition or chemical treatment process. Silicon dioxide particles having a particle size of 10-150 Angstrom (silica sol) are embedded into 100-300 Angstrom defects or micro pores of the insulating film. When chromate film is formed by chemical treatment, silica sol is added into chromate treatment solution, and silica particles are reportedly embedded into a chromate film when chromate is deposited. For example, the anode can with insulating film is subjected to heat treatment at 150° C. or more (400-600° C.). By this heat treatment, silica particles reportedly become insoluble in water and alkali resistant.

Japanese Publication No. 09-035694 relates to a laminated body prepared by stacking about a 50μ thick modified polyethylene film, a metal laminate film obtained by piling about 40μ thick resin layers on each side of an about 10μ thick metal plate, and an about 10μ thick resin layer. An electrode group is inserted into a cylindrical can body with the bottom having a square cross section, an electrolyte is poured, a sealing plate and a gasket are fit to an opening end of the can body, the opening end is caulked, the gasket and the sealing plate are interposed between the opening end and a projection strip, the opening end is sealed to form a caulked part. The laminated body is arranged so as to cover the caulked part and the sealing plate, the laminated body is pushed to a hot plate to melt the film, and the laminated body is fused to the portion over from the opening end of the cart body to the sealing plate.

Japanese Publication No. 2002-198019 relates to a small-sized lithium cell with reportedly high accuracy, excellent air tightness, and good workability at manufacture, without slippage of a gasket when mounting is obtained by laminating and integrally molding a gasket made of a synthetic polymer resin film and a positive electrode metal case. A biodegradable synthetic polymer resin film, especially a polyvinyl alcohol film, is recommended as a synthetic polymer resin film. By using this film, the danger of environmental pollution is reportedly eliminated because the film is quickly decomposed when discarded as a used cell.

Thermoplastic seal members, such as polypropylene seal members can have high solvent vapor transmission rates. The problem of reducing the rate of transmission of electrolyte vapor or gas through the seal member is generally greater at higher temperatures and with more volatile organic solvents with relatively low boiling points. Therefore, it would be desirable to have an electrochemical battery cell with improved seal characteristics, especially wherein vapor transmission of electrolyte through one or more seal members is reduced.

SUMMARY OF THE INVENTION

In view of the above, it is an object of the present invention to provide an improved electrochemical battery cell comprising nonaqueous electrolyte, wherein the cell is low in salting, leakage, and vapor transmission between the interior and exterior of the cell.

Another object of the present invention is to provide an electrochemical battery cell with an improved seal member comprising a thermoplastic body and one or more coatings or layers on the body that reduce the vapor transmission rate of the seal member.

A further object of the present invention is to provide economical seal members for use as a seal between a cell container and a cell cover and for use in a pressure relief vent assembly, wherein the seal members have reduced vapor transmission rates.

The above objects are met by an improved electrochemical battery cell of the present invention. It has been discovered that the effectiveness of a seal member for a nonaqueous electrolyte-containing electrochemical cell can be improved by providing the seal member body comprising a thermoplastic resin with one or more vapor transmission barrier coatings or layers on one or more portions of the body, independently, wherein the coating or layer can be one or more of a metallized layer and an insulating inorganic material layer, for example. The seal members form a desirable seal with other components of the cell such as the cell container and cell cover thereby preventing leakage therebetween. The seal members further have low vapor transmission rates and electrolyte vapor transmission and/or water vapor transmission through the seal member itself can be substantially reduced, even when the cell electrolyte contains a large amount of volatile solvent.

Accordingly, in one aspect, the present invention is directed to an electrochemical cell, comprising a metal container having a closed bottom end, a sidewall and an open end, a cell cover disposed in the open end of the container, a spirally wound electrode assembly disposed within the container, said assembly comprising a positive electrode coated onto a current collector, a negative electrode consisting essentially of lithium or a lithium alloy, a separator disposed between the positive and negative electrodes, and a nonaqueous volatile electrolyte, and a seal member disposed in the open end of the container and in contact with one or more of a portion of the container and a portion of the cell cover for sealing the electrode assembly within the seal, said seal member having a first surface exposed to the electrolyte or a vapor of the electrolyte within the container and a second surface not directly exposed to the electrolyte, the seal member comprising a thermoplastic resin body having a surface coating of one or more layers on at least a portion of the thermoplastic resin body for reducing vapor transmission through the seal member, said surface coating including a metallized layer or an inorganic electrically insulating material, or a combination thereof.

In another aspect of the present invention, a primary electrochemical cell is disclosed, comprising a cylindrical, metal container having a closed bottom end, a sidewall and an open end, a cell cover disposed in the open end of the container, a reaction chamber defined by the container and the cell cover, said reaction chamber having a positive electrode disposed on a current collector, a negative electrode comprising lithium, a separator disposed between the positive and negative electrodes, and a nonaqueous, organic electrolyte, and a seal member comprising a thermoplastic resin body positioned between the container and the cell cover, said seal member providing electrical insulation between the container and the cell cover and having: (i) an inner surface in communication with the reaction chamber, (ii) an outer surface not in communication with the reaction chamber, and (iii) a metallized surface layer that is essentially non-permeable to the electrolyte, said surface layer coated on a portion of at least one of the inner surface and the outer surface.

In still another aspect of the present invention, an electrochemical cell, is disclosed, comprising a metal container having a closed bottom end, a sidewall and an open end, a cell cover disposed in the open end of the container, a positive electrode, a negative electrode comprising lithium, a separator disposed between the positive and negative electrodes, a nonaqueous electrolyte comprising an organic solvent, and an electrically insulating seal member disposed between the container and a portion of the cell cover and comprising a thermoplastic resin body, said seal member having a surface coating comprising an inorganic, nonconductive material.

These and other features, advantages and objects of the present invention will be further understood and appreciated by those skilled in the art by reference to the following specification, claims and appended drawings.

BRIEF DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

Seal members of the present invention are particularly useful in electrochemical cells to provide a seal between a container of the cell and a cell cover or end assembly, wherein the seal member aids in preventing short circuiting between the container and cell cover which can be of different polarity, and wherein the seal member is constructed to have a relatively low vapor transmission rate and to minimize electrolyte leakage from the cell. The seal members are formed in additional embodiments, for example, as a component of a vent assembly. The invention is particularly relevant to cells containing nonaqueous electrolytes. In a preferred embodiment, the cell is a nonaqueous primary cylindrical Li/FeS$_2$ cell, for example a AA or AAA cell, i.e., according to IEC nomenclature, FR6 and FR03, respectively, such as described in connection with the drawings hereinbelow. However, the invention may also be adapted to other types of cells, such as non-cylindrical, for example prismatic cells, cells with other active materials or chemical systems, for example lithium-ion, nickel-metal hydride, lithium/manganese dioxide, LiCF$_x$, etc.; cells with other electrolyte solvents, for example water; and cells with vent designs other than comprising a ball-type vent. The disclosure is also applicable to various other cylindrical cell sizes, for example R6, R03, etc.

Figure 1:
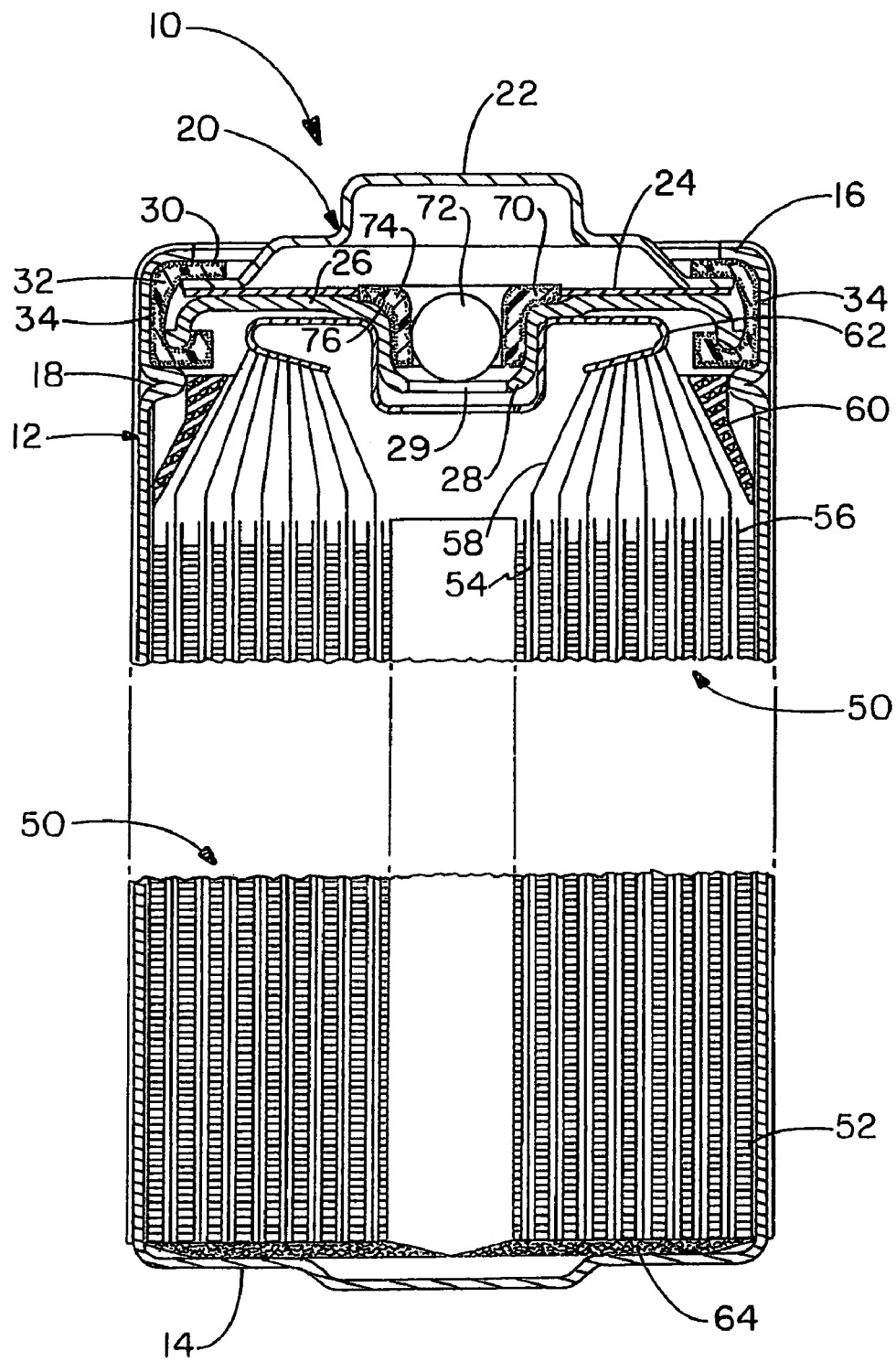
FIG. 1 is a cross-sectional elevational view of a cylindrical electrochemical cell including a thermoplastic seal member between the container and cell cover and a second thermoplastic seal member between a portion of the cell cover and a vent ball, wherein the seal members each have an inorganic surface coating.

Referring now to the drawings, FIG. 1 illustrates a FR6 type cylindrical electrochemical cell 10, which has a can or container 12 with a closed bottom end 14 and an open top 16 closed by an end assembly having a cell cover 20 comprising a conductive terminal 22, an internal seal plate 26 and a positive temperature coefficient (PTC) device 24 that substantially limits the flow of current under abusive electrical conditions. A gasket seal member 30 is disposed between a portion of cell cover 20, generally a peripheral portion, and container 12 and includes one or more portions that are nonconductive to prevent short circuiting when the cell cover includes an electrically conductive portion such as a perimeter of the conductive terminal 22, PTC 24, or internal seal plate 26 that would otherwise come into contact with the container 12. The container 12 has a bead or reduced diameter step 18 near the top end 16 of the container 12 to support seal member 30 and cell cover 20.

Seal member 30 is compressed between the container 12 and cell cover 20 to seal the electrode assembly 50 comprising an anode or negative electrode 52, a cathode or positive electrode 54, separator 56, and electrolyte within cell 10. Electrode assembly 50 can be of a type such as, but not limited to, folded strips, stacked plates and spirally wound, with a spirally wound or jelly-roll type electrode assembly preferred as illustrated in FIG. 1. Spiral-wound electrodes, as known in the art, are generally electrode strips that are combined into an assembly by winding along their lengths or widths, for example around a mandrel or central core. Separator 56 is preferably a thin microporous membrane that is ion-permeable and electrically nonconductive that is disposed between adjacent surfaces of the positive electrode 54 and negative electrode 52 to electrically insulate the electrodes from each other. Portions of the separator may also insulate other components in electrical contact with the cell terminals to prevent internal short circuits. Edges of the separator often extend beyond the edges of at least one electrode to insure that the negative electrode and positive electrode do not make electrical contact even if they are not perfectly aligned with each other. However, it is desirable to minimize the amount of separator extending beyond the electrodes. The positive electrode 54 includes a current collector 58 preferably metal, that extends from the top of the electrode assembly and is electrically connected to a contact spring 62. An insulating member 60, such as a cone, formed of any suitable insulating material, can be disposed between contact spring 62 and the container sidewall to prevent an internal short circuit. The negative electrode 52 is electrically connected to the inner surface of container 12, preferably by a metal tab (not shown) in one embodiment. The container 12 serves as the negative contact terminal. Contact between positive electrode 54 and the bottom of container 12 can be prevented by the inward folded extension of separator 56 and/or an electrically insulating disk 64 positioned in the bottom of container 12. Seal plate 26 is typically metal or another electrically conductive material such as, but not limited to, steel such as nickel plated steel and stainless steel.

Cell 10 also includes a pressure relief vent. The internal seal plate 26 has an aperture comprising an inwardly projecting central vent well 28 with a vent hole 29 in the bottom of well 28. The aperture is sealed by a vent ball 72 and a thermoplastic bushing or (second) seal member 70, which is compressed between the vertical walls of vent well 28 and the periphery of the vent ball 72. When the cell internal pressure exceeds a predetermined level, the vent ball 72 or both ball 72 and seal member 70 are forced out of the aperture to release pressurized gasses from the cell 10. Internal seal plate 26, seal member 30, pressure relief vent assembly and container 12 cooperate to maintain electrode assembly 50 and electrolyte in the lower portion of container 12.

The gasket seal member 30 includes a seal body 32 and a seal coating 34 of one or more layers in contact with one or more portions of the seal body 32. Gasket seal member 30, in a cylindrical cell such as shown in FIG. 1, is an annular member having a sidewall with an outer surface adapted to be in contact with a sidewall of container 12. The outer sidewall diameter or contour of seal member 30 is preferably substantially constant along a major portion of its length as shown, but can vary. In one embodiment, such as shown in FIG. 1, the outer sidewall diameter of the seal member preferably has a curved or rounded upper portion that transitions into a substantially horizontal top surface that conforms to a desired shape of the crimped container top end to facilitate sealing between the container and seal member. The inner sidewall diameter or contour preferably varies along its length to aid in securing the cell cover 20 within the container such as shown, but can be substantially constant, if desired. The lower end of the gasket seal member 30 extends inwardly from the outer sidewall, forming a ledge, and has a terminal end that extends upwardly creating an annular seat for seal plate 26 and preferably having a shape complementary thereto, such as illustrated. The lower end of the gasket seal member 30 can also be described as having an "L"-type edge. The seal plate 26 outer, lower end is situated on the ledge between the inner diameter of the outer sidewall and the upwardly extending lower terminal end of the seal member. The upper end of the gasket seal member 30 extends inwardly and preferably covers a portion of the outer diameter or peripheral edge of conductive terminal 22 and prevents contact between terminal 22 and top end 16 of container 12 after cell crimping such as shown in FIG. 1. In one embodiment, the outer diameter of the cell cover 20, gasket seal member 30 and container 12 are crimped such that the gasket is compressed by about 30 percent of its original thickness to provide a good seal when the seal body 32 is polypropylene and the cell is a FR6-type cell. Compression of the gasket to obtain a desirable seal can vary depending on the composition of the seal body polymer and any additional additives therein, as well as the configuration of the cell or container, among other factors.

The seal body 32 comprises a polymer, preferably a thermoplastic polymer. Any suitable thermoplastic materials that can accept the one or more coating layers of the seal coating applied to at least a portion thereof, provide the desired adhesive properties with respect to the applied layer(s) and maintain desired sealing properties when assembled in the cell can be used. Examples of suitable materials for nonaqueous cells include, but are not limited to, polyolefins, especially polypropylene, polyphenylene sulfide, polyphthalamide, fluoropolymers such as ethylene-tetrafluoroethylene copolymer, and polyamides such as Nylon-6,6. Polyolefins are available commercially from many sources. Polyphthalamide is available from Solvay S.A. of Alpharetta, Ga. as AMODEL®. Fluoropolymers are available from DuPont of Wilmington, Del. as TEFZEL®.

As known to one of ordinary skill in the art, (co)polymer (s), i.e., a polymer or copolymer, of the body can include various additives, fillers or the like as known in the art in various amounts. Filler examples include, but are not limited to, ceramic powders, glass spheres, wood flour, sand, thermostabilizing fillers such as E-glass, fibers, glass, clay, feldspar, graphite, mica, silica, talc and vermiculite. Additives include, but are not limited to, plasticizers, lubricants, colorants, flame retardants, antioxidants, antistatics, processing aids, smoke suppressants, and impact modifiers. In a preferred embodiment, the seal body 32 is substantially free or free of any conductive components. The seal body 32 can be manufactured utilizing any suitable process, such as injection molding which is preferred. As known in the art, the particular (co) polymer chosen may need to be dried in order to reduce the moisture level prior to molding. The (co)polymer chosen is molded at appropriate temperature therefore as known in the art. For example, when the (co)polymer comprises polypropylene, suitable molding temperatures range from about 190° C. to about 260° C.

After the seal body 32 has been formed into a desired shape, one or more same or different surface layers are independently applied to the seal body 32 and form seal coating 34. Depending upon the composition of seal coating layer(s), the seal coating 34 can be applied to only a portion of the surface of seal body 32 or the entire surface of seal body 32. When two or more seal coating layers are used to form a seal coating 34 of a seal member, the second or any subsequently applied layer can, independently, contact one or more of a portion of the seal body 32 and a portion of one or more previously applied seal coating layers. Coating layer configurations of seal members can be tailored according to cell design to reduce vapor transmission through the seal member. The seal coating 34 is non-permeable to the electrolyte and electrolyte vapor present within the cell 10. That is, seal coating 34 does not allow for transmission of substantially any electrolyte in liquid or vapor form to be transmitted from one side of the coating to the other, i.e., therethrough.

As a primary goal of the seal coating 34 is to provide a vapor transmission barrier to electrolyte vapor within the cell, it is desirable in one embodiment to apply the seal coating 34 to the surfaces of the seal member 30 exposed to the electrolyte vapor within the cell, generally the surface of the seal member 30 located between the inner surface of the container 12 and inner surface of the seal plate 26 in the case of a gasket, and the surface of the seal member 70 exposed to the interior of the cell 10 between the seal plate 26 and vent ball 72 in the case of the pressure relief vent bushing seal member 70. When seal coating 34 includes a conductive coating, the seal coating 34 is applied so that no short circuit is provided, particularly, between the container 12 and the internal seal plate 26, or, more generally, two other conductive components, when the same are of different polarity.

In one embodiment, the seal coating 34 comprises at least one substantially nonconductive layer comprising an inorganic material applied to one or more desired portions of the seal body 32 or another seal coating layer. The at least one inorganic material layer seal coating, in addition to being electrically insulating, dielectric or nonconductive, provides barrier properties to gas transmission and reduces transmission of electrolyte vapor through the seal body 32. The electrically insulating inorganic materials are generally insulating metal oxides, metalloid oxides, metal nitrides, or metalloid nitrides, or a combination thereof. Examples of suitable inorganic materials for the inorganic material layer include, but are not limited to, silicon-containing compounds such as silicon oxide silicon dioxide, or silicon nitride, aluminum oxide, aluminum nitride, boron nitride, and the like. Silicon dioxide is preferred in one embodiment. The inorganic material layer or layers may each contain a relatively small amount of one or more impurities from the source material used. For example, the silicon oxide or dioxide layer may contain a small amount of carbon if the coating method is plasma enhanced chemical vapor deposition using a chemical like hexamethyldisiloxane. FIG. 1 illustrates the entire surface of seal body 32 surrounded by a seal coating 34 of an inorganic material layer.

In another embodiment, one or more layers of the seal coating 34 comprise a metallized layer, deposited on a portion of a surface of the seal body 32 or a prior layer such as an inorganic material layer or another metallized layer, or a combination thereof. When a metallized layer is utilized to form a portion of the seal member 30 or 70, care must be taken to insure that no short circuit is created within the cell between components of different polarity in contact with the respective seal member. Therefore, in some embodiments a metallized layer is applied to only certain portions of the seal body to prevent short circuits between cell components. In another embodiment, substantially all or all portions of the seal body are coated with a metallized layer and an insulating material, such as a nonconductive layer, is applied over all or a portion of the metallized layer to prevent a short circuit.

When it is desired that one or more seal coating layers are to be formed as a metallized layer, generally any suitable metal can be utilized. Metallized layers can be the same or different materials. Examples of suitable metals include, but are not limited to, aluminum, nickel, copper, tin and/or alloys thereof. The preferred metals are aluminum and nickel.

Figure 2:
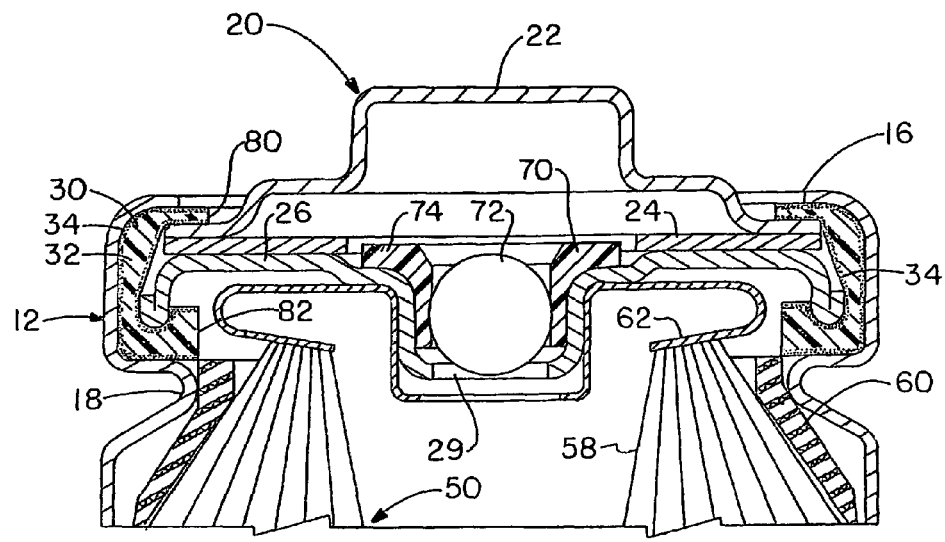
FIG. 2 is a cross-sectional side elevational view of a portion of a cylindrical electrochemical cell including a seal member disposed between a cell container and a cell cover and having a metallized surface coating on a portion of a thermoplastic body thereof.

Various configurations of metallized layers can be utilized to reduce vapor transmission through the seal body without creating a short circuit within the cell. In one embodiment as illustrated in FIG. 2, substantially all of the seal body 32 includes a seal coating 34 comprising a metallized layer except for two annular ring sections 80, 82 to prevent the cell from direct shorting between the container 12 and a conductive portion of the cell cover 20. The unmetallized ring section 80 is located on the inner diameter of the inner sidewall upper portion of the seal body 32. The unmetallized ring section 82 is located on the inner diameter sidewall portion of the upwardly extending lower terminal end of the seal body 32. As illustrated, the metallized layer forming seal coating 34 covers a portion of the seal body 32 exposed to the interior of the cell between container 12 and internal seal plate 26, thereby reducing vapor transmission through seal member 30.

Figure 3:
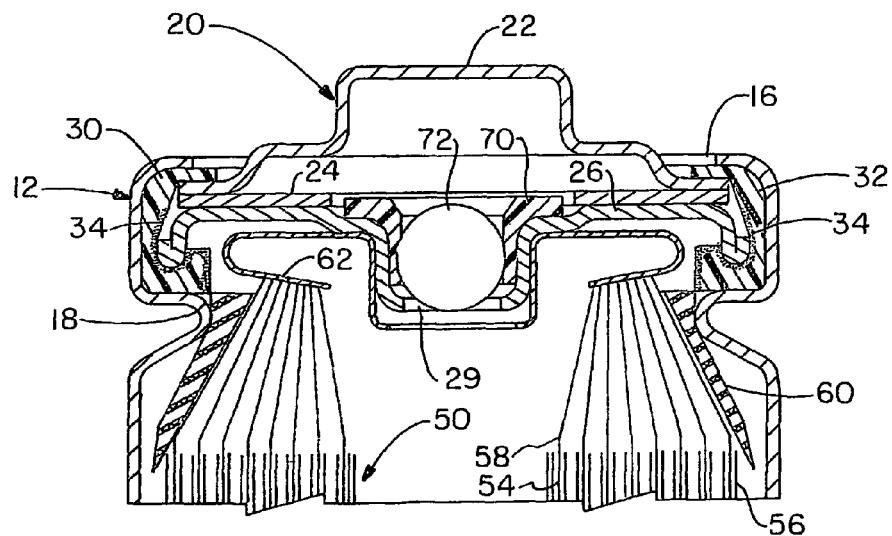
FIG. 3 is a cross-sectional side elevational view of a further embodiment of a portion of a cylindrical electrochemical cell including a seal member disposed between a cell container and a cell cover and having a metallized surface coating on a portion of a thermoplastic body thereof.

In a further embodiment as illustrated in FIG. 3, an inner portion of the seal body 32 is provided with a seal coating 34 of a metallized layer which generally has a first end located at the base of the inner diameter sidewall portion of the lower terminal end of the seal body with the layer extending upwardly on and over the "L"-type edge and continuing along the inner diameter of the seal body past the annular seat for seal plate 26 and terminating at a location along the inner diameter, below the inner diameter upper end such that no contact is made with conductive terminal 22 in order to avoid an electrical bypass of the PTC. A major portion of seal body 32 exposed to the interior of the cell reaction chamber between container 12 and internal seal plate 26 is covered by seal coating 34.

Figure 4:
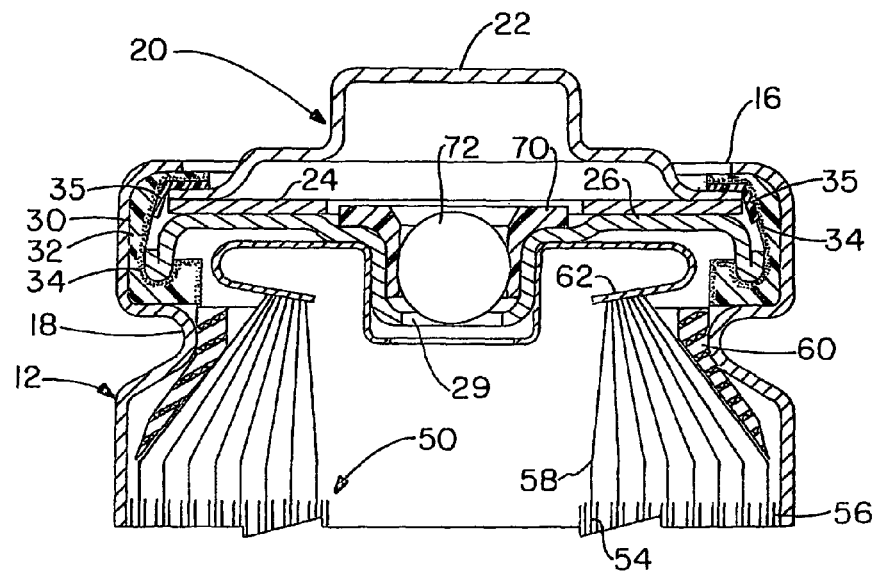
FIG. 4 is a cross-sectional side elevational view of a further embodiment of a cylindrical electrochemical cell including a seal member disposed between a cell container and a cell cover and having a metallized surface coating on a portion of a thermoplastic body thereof.
Figure 5:
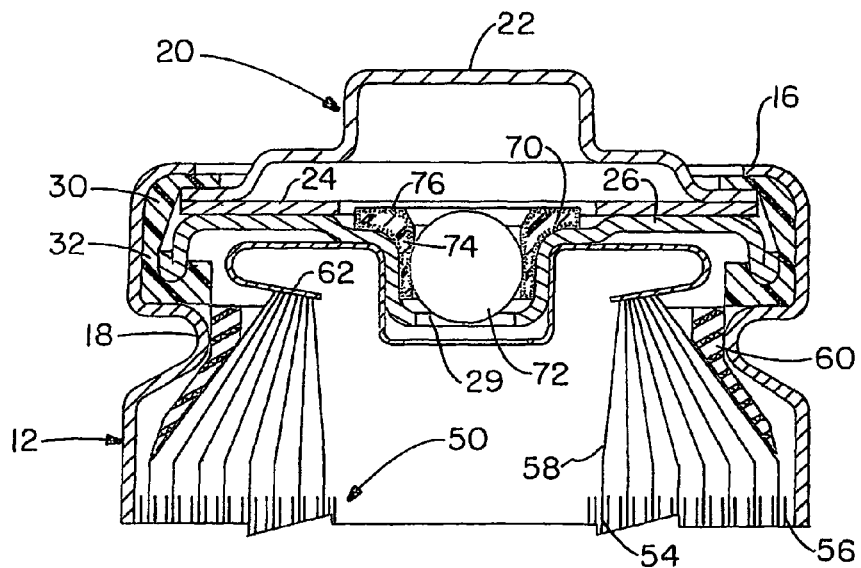
FIG. 5 is a cross-sectional side elevational view of an embodiment of a cylindrical electrochemical cell including a seal member that is a component of a pressure relief vent assembly, wherein the surface of the seal member has a metallized coating in order to reduce vapor transmission through the seal member.

In yet a further embodiment as illustrated in FIG. 4, the entire inner diameter portion of the seal body, between the top and bottom ends, is provided with a metallized layer to reduce vapor transmission through the seal body 32, and an insulating coating 35, such as a nonconductive layer, for example an inorganic material layer as described herein, is provided on a surface adjacent the PTC 24 and a portion of conductive terminal 22 to avoid bypassing the PTC.

Each of the one or more layers of seal coating 34 can, independently, be formed using a process including, but not limited to, electrolysis plating, chemical plating, electroplating, electroless plating, sputtering, vacuum deposition, vacuum evaporation, chemical vapor deposition, or a combination thereof.

In one embodiment, an electroless plating step is utilized to form a conductive nickel layer on seal body 32. The electroless plating step is accomplished without the use of electricity. The non-conductive seal body is placed in a bath solution, in the temperature range of about 85° C. to about 95° C., including a reducing agent, such as 10 ml/L of formaldehyde, and the desired metal(s) in ionic form, such as 5 g/L of nickel sulfate. Electrons from the reducing agent work to deposit the metal ions on to the seal body in the presence of a catalyst, such as platinum. Use of other components such as complexing agents, pH modifying agents, buffers, stabilizers, etc. may further assist in the process. The process may be repeated multiple times in order to create multiple layers of deposited material. In such cases, deionized water can be used to rinse the part between platings, and the seal body having one or more metallized layers should be dried prior to incorporation into an electrochemical cell. Prior to metallization, the seal body can undergo one or more pretreatment processes, including, but not limited to, cleaning, etching, neutralizing and activating. The seal body is provided with a mask in one embodiment that prevents deposition of metal on a desired area of the body, for example ring sections 80 and 82 as shown in FIG. 1. Additionally, to insure a satisfactory bond between the deposited metal/metal alloy and the seal body, the seal body should be rinsed with the deionized water or other suitable solvent(s) between material depositions. A deposited or applied metallized layer can be removed from one or more areas of the seal body mechanically, such as by grinding or abrading, if desired.

In a further embodiment, the seal body 32 can be provided with a seal coating 34 of an electroplated layer, which as also indicated above, can be applied directly to a portion of the seal body, or at least a portion of the prior seal coating layer, or a combination thereof. The electrolytic plating can be performed utilizing any suitable device known in the art, such as a barrel plating device, for example a lab scale barrel plater available from Sterling Systems of St. Charles, Ill., or a vibrating plating device.

In another embodiment, the seal body 32 can be provided with a seal coating 34 of a metallized layer by direct vacuum evaporation, which has been widely used for metallizing plastic packaging films. Suitable metal materials include aluminum, nickel, copper, tin, and alloys thereof, and the like. The preferred materials are aluminum and nickel because aluminum is capable of being deposited at very high rate and both aluminum and nickel are resistant to corrosion by non-aqueous electrolytes used in consumer $Li/MnO_2$ and $Li/FeS_2$ cells.

Seal coating 34 of one or more layers of inorganic material can be deposited on the seal body 32 or a portion of one or more other layers utilizing a suitable deposition process, for example a chemical vapor deposition process such as plasma enhanced chemical vapor deposition process. Physical vapor deposition techniques such as reactive evaporation and sputtering, utilizing suitable inorganic material compositions and reactive gasses may also be employed to deposit a layer of inorganic material as a seal coating 34. An inorganic material layer applied as a layer of seal coating 34 on seal body 32 or another layer is highly adherent to the seal body and has stretchability and flexibility to withstand compression of the seal member 30. Chemical vapor deposition is a relatively low heat process and can deposit on substrates having relatively low melting points such as polyethylene and polypropylene. The preferred process is the plasma enhanced chemical vapor deposition process as this process enables the production of coatings at low gas and surface temperatures, which are advantages for the seal member which is a thermoplastic material often having a relatively low melting point, e.g., about 165° C. for polypropylene.

Thickness for each of the layers of the seal coating applied to a portion of the seal body and/or another coating layer are sufficient to provide for a desired level of resistance to vapor transmission of the nonaqueous electrolyte. Thickness of each layer can vary, and depend on one or more of the number of coating layers present on the seal member, composition of the coating layer and composition of the seal body to which the coating layer is applied, among other factors. The total thickness for one or more metallized layers applied as a seal coating to a portion of the seal body, or any other layer thereon, ranges generally from about 1 to about 25 micrometers, desirably from about 5 to about 20 micrometers, and preferably from about 10 to about 15 micrometers. One or more metallized layers having a total thickness below the noted ranges form less effective barrier layers and can, for example, include pin holes that allow vapor to be transmitted therethrough. One or more coating layers having thickness above the indicated upper range could cause the metallized coating layer to delaminate from the substrate when the seal member is compressed during cell closing. Costs also increase as the thickness of the metallized layer increases. The total thickness of one or more inorganic layers applied to a portion of the seal body, or any other layer thereon, ranges generally from about 5 to about 30 microns and is preferably from about 10 to about 25 microns in order to provide a desirable vapor transmission barrier layer. It is important to note that total thickness of the seal coating at a first location when compared to a second location, can vary. Likewise, thickness of an individual coating layer of the seal coating can likewise vary from location to location.

An electrochemical cell may include other seal members in addition to a seal member 30 disposed between a container and cell cover through which electrolyte solvents or vapors from inside a cell can travel or migrate therethrough and eventually leak or escape from the cell. Accordingly, it is preferred to provide other seal members with one or more layers of a seal coating to reduce or prevent the solvent or vapor migration. For example, in some embodiments, as indicated above, it is desirable to provide seal member, which is a vent bushing 70, with one or more layers that reduce solvent or vapor transmission therethrough. The vent bushing 70 has a bushing body 74 that is generally a thermoplastic material that provides an effective seal vent over a broad temperature range. Then bushing body 74 can include materials described hereinabove with respect to seal member body 32 described herein and incorporated by reference. The bushing can also be constructed as described in U.S. Patent Application Publication Nos. 2005/0079404 and 2005/0079413, herein fully incorporated by reference.

In a preferred embodiment, the wall of the vent bushing body between the vent ball 72 and the vent well 28 and the cell cover 20 has a thickness that ranges from about 0.006 inch (0.152 mm) to about 0.015 inch (0.381 mm) and be compressed by about 25 to about 40 percent when the vent bushing and vent ball are inserted into the cell cover, when the vent bushing is polypropylene and the cell is a FR6-type cell. The vent bushing can be manufactured utilizing any suitable process. Injection molding is an example of a preferred process. Molding parameters will vary with the type of material being molded, as known in the art.

The cell container is often a metal can with an integral closed bottom, although a metal plate can be fastened to one end of a metal tube to provide a container with a closed bottom. The container is generally steel, plated with nickel on at least the outside to protect the outside of the container from corrosion. The type of plating can be varied to provide varying degrees of corrosion resistance or to provide the desired appearance. The type of steel will depend in part on the manner in which the container is formed. For drawn cans, the steel can be a diffusion annealed, low carbon, aluminum killed, SAE 1006 or equivalent steel, with a grain size of ASTM 9 to 11 in one embodiment and equiaxed to slightly elongated grain shape. Other steels, such as stainless steels, can be used to meet special needs. For example, when the can is in electrical contact with the cathode, a stainless steel may be used for improved resistance to corrosion by the cathode and electrolyte.

The cell cover should have good resistance to corrosion by water in the ambient environment, include a conductive terminal such as a cap with good electrical conductivity and, when visible on consumer batteries, an attractive appearance. Conductive portions of terminal caps are often made from nickel plated cold rolled steel or steel that is nickel plated after the caps are formed. A nonconductive portion of a cell cover can be any suitable thermoplastic material, such as polypropylene and polyethylene, and can also have one or more vapor transmission barrier coating layers on a portion thereof as described herein, if desired. Coating layers are preferred if the electrolyte solvent or vapor can be transmitted through a portion of the terminal cap. Where terminals are located over pressure relief vents, the terminal generally has one or more holes to facilitate cell venting.

The vent ball can be made from any suitable material that is stable in contact with the cell contents and provides the desired cell sealing and venting characteristics. Glasses or metals, such as stainless steel, can be used. The vent ball should be highly spherical and have a smooth surface finish with no imperfections, such as gouges, scratches or holes visible under 10 times magnification. The desired sphericity and surface finish depends in part on the ball diameter.

In one embodiment of an FR6 Li/FeS$_2$ cell according to FIG. 1, the upstanding sidewall of the seal body is about 0.0205 inch (0.521 mm) thick. The diameters of the cell cover, seal member and crimped can are such that the seal member is compressed by about 30 percent of its original thickness to provide a good seal for a polypropylene seal body. The seal member is optionally coated with a sealant, such as an organic sealant, to provide desired sealing between adjacent surfaces. Ethylene propylene diene terpolymer (EPDM) is a suitable sealant material, but other suitable materials such as asphalt can be used. The initial vent bushing wall thickness is about 0.0115 inch (0.292 mm) in one embodiment of a FR6-type cell. It is compressed by about 30 to 35 percent of its original thickness in the sealed cell. Cells of other sizes and constructions accordingly contain an appropriately configured seal member. A sealant could be used between the vent bushing and the cell cover or internal seal plate or between the vent bushing and the vent ball, or a sealant could be applied over the cover, bushing and ball to improve the seal, or a combination thereof.

The negative electrode or anode of a lithium cell, such as a FR6 type cell, contains lithium metal, typically in the form of a sheet or foil strip. The composition of the lithium can vary, though the purity is preferably always high. The lithium can be alloyed with other metals, such as aluminum, to provide the desired cell electrical performance. A preferred lithium alloy is a battery grade lithium-aluminum alloy comprising about 0.5 weight percent aluminum, available from Chemetall Foote Corp. of Kings Mountain, N.C., USA. When the negative electrode or anode is a solid piece of lithium, a separate current collector within the negative electrode is generally not used, since the lithium metal has a very high electrical conductivity. However, a separate current collector can be used to provide electrical contact to more of the remaining lithium toward the end of cell discharge. Copper is often used because of its conductivity, but other conductive metals can be used as long as they are stable inside the cell. A conductive metal strip such as, but not limited to, a thin strip of nickel, nickel plated steel, copper or a copper alloy, can be used to make electrical contact between the lithium negative electrode and the container. This strip can be pressed into the surface of the lithium foil. The strip can be welded to the inside surface of the container, or it can be held firmly against the container to provide a pressure contact. Because lithium and lithium alloy metals are typically highly conductive, a separate current collector within the negative electrode is often unnecessary in lithium and lithium alloy negative electrodes.

A negative electrode for a lithium ion cell includes one or more lithium-intercalable materials (capable of insertion and deinsertion of lithium ions into their crystalline structure). Examples of suitable materials include, but are not limited to, carbons (e.g., graphitic, mesophase and/or amorphous carbons), transition metal oxides (e.g., those of nickel, cobalt and/or manganese), transition metal sulfides (e.g., those of iron, molybdenum, copper and titanium) and amorphous metal oxides (e.g., those containing silicon and/or tin). These materials are generally particulate materials that are formed into a desired shape. Conductive materials such as metal, graphite and carbon black powders may be added to improve electrical conductivity. Binders may be used to hold the particulate materials together, especially in cells larger than button size. Relatively small amounts of various additives may also be used to enhance processing and cell performance. The negative electrode optionally includes a current collector; copper is a common choice. The current collector may be a thin metal foil sheet, a metal screen, an expanded metal or one or more wires. The negative electrode mixture (active material and other ingredients) can be combined with the current collector in any suitable manner. Coating and embedding are examples.

A positive electrode for a lithium cell contains one or more active materials, usually in particulate form. Any suitable positive electrode material may be used. Examples include, but are not limited to, $FeS_2$, $MnO_2$, $CF_x$ and $(CF)_n$.

The positive electrode or cathode of an FR6 type cell contains iron disulfide as an active material. A preferred iron disulfide is a battery grade $FeS_2$ having a purity level of at least 95 weight percent, available from American Minerals, Inc. of Camden, N.J., USA; Chemetall GmbH of Vienna, Austria; Washington Mills of North Grafton, Mass., USA; and Kyanite Mining Corp. of Dillwyn, Va., USA. The $FeS_2$ can be milled and sieved to achieve the desired particle size distribution and remove large particles that could puncture the separator in the cell. The largest particles should be smaller than the thinnest coating of cathode material on the current collector. Preferably the average particle size is no greater than about 30 µm, and more preferably less than about 20 µm. In addition, the positive electrode or cathode often contains one or more conductive materials such as metal, graphite and carbon black powders. Examples of suitable conductive materials include KS-6 and TIMREX® MX15 grades synthetic graphite from Timcal America of Westlake, Ohio, USA, and grade C55 acetylene black from Chevron Phillips Company LP of Houston, Tex., USA. A binder may be used to hold the particulate materials together. Ethylene/propylene copolymer (PEPP) made by Polymont Plastics Corp. of Akron, Ohio, USA, and G1651 grade styrene-ethylene/butylene-styrene (SEBS) block copolymer from Kraton Polymers of Houston, Tex., USA, are suitable for use as a binder. Small amounts of various additives may also be used to enhance processing and cell performance. Examples include POLYOX®, a nonionic water soluble polyethylene oxide from Dow Chemical Company of Midland, Mich., USA, FLUO HT® micronized polytetrafluoroethylene (PTFE) manufactured by Micro Powders Inc. of Tarrytown, N.Y., USA (commercially available from Dar-Tech Inc. of Cleveland, Ohio, USA), and AEROSIL® 200 grade fumed silica from Degassa Corporation Pigment Group of Ridgefield, N.J., USA.

A positive electrode for a lithium ion cell contains one or more lithium-intercalated or lithium-intercalable active materials, usually in particulate form. Any suitable active lithium-intercalated or lithium-intercalable material may be used, alone or in combination with others. Examples include metal oxides (e.g. those of vanadium and tungsten), lithiated transition metal oxides (e.g., those including nickel, cobalt and/or manganese), lithiated metal sulfides (e.g., those of iron, molybdenum, copper and titanium) and lithiated carbons.

In addition to the active material, a positive electrode for a lithium or lithium ion cell often contains one or more conductive materials such as metal, graphite and carbon black powders. A binder may be used to hold the particulate materials together, especially for cells larger than button size. Small amounts of various additives may also be used to enhance processing and cell performance.

A positive electrode current collector may be required. Aluminum foil is a commonly used material. A mixture of the positive electrode or cathode materials in a solvent can be coated onto the aluminum foil using a suitable process, such as a roll coating process, followed by evaporation of the solvent. The coated aluminum foil can then be densified, by calendering, for example, and can also be dried prior to use.

The contact spring can be made of a conductive metal with low resistivity, such as nickel plated stainless steel, that is chemically stable in the cell internal environment. It should also have good spring characteristics. Preferably the spring force constant (stiffness) will be sufficient for the spring to apply at least a minimum amount of force against the positive electrode current collector, contact member, or other cell components. The spring can be affixed to the internal seal plate in any suitable manner that will maintain good electrical contact. For example, the contact spring can be welded to a lower surface of the internal seal plate and may provide lower internal resistance.

Any suitable separator material may be used. Suitable separator materials are ion-permeable and electrically nonconductive. The separator materials are generally capable of holding at least some electrolyte within the pores of the separator. Suitable separator materials are also strong enough to withstand cell manufacturing and pressure that may be exerted on them during cell discharge without tears, splits, holes or other gaps developing. Examples of suitable separators include microporous membranes made from materials such as polypropylene, polyethylene and ultrahigh molecular weight polyethylene. Preferred separator materials for $Li/FeS_2$ cells include CELGARD® 2400 microporous polypropylene membrane from Celgard Inc. of Charlotte, N.C., USA, and Tonen Chemical Corp.'s Setella F20DHI microporous polyethylene membrane, available from Exxon Mobil Chemical Co. of Macedonia, N.Y., USA. A layer of solid electrolyte or a polymer electrolyte can also be used as a separator.

Electrolytes for lithium and lithium ion cells are nonaqueous electrolytes. In other words, they contain water only in very small quantities (e.g., no more than about 500 parts per million by weight, depending on the electrolyte salt being used) as a contaminant. Suitable nonaqueous electrolytes contain one or more electrolyte salts dissolved in an organic solvent or solution. The nonaqueous electrolytes are volatile and have vapor pressures under normal conditions, i.e., a temperature between about 0° C. to about 40° C., that allow a portion of the electrolyte to vaporize and enter the ambient atmosphere i.e., of the reaction chamber. Any suitable salt may be used, depending on the negative and positive electrode active materials and the desired cell performance. Examples include lithium bromide, lithium perchlorate, lithium hexafluorophosphate, potassium hexafluoro-phosphate, lithium hexafluoroarsenate, lithium trifluoro-methanesulfonate and lithium iodide. Suitable organic solvents include one or more of the following: dimethyl carbonate, diethyl carbonate, methylethyl carbonate, ethylene carbonate, propylene carbonate, 1,2-butylene carbonate, 2,3-butylene carbonate, methyl formate, γ-butyro-lactone, sulfolane, acetonitrile, 3,5-dimethylisoxazole, n,n-dimethyl formamide and ethers. The salt/solvent combination will provide sufficient electrolytic and electrical conductivity to meet the cell discharge requirements over the desired temperature range. While the electrical conductivity is relatively high compared to some other common solvents, ethers are often desirable because of their generally low viscosity, good wetting capability, good low temperature discharge performance and good high rate discharge performance. This is particularly true in $Li/FeS_2$ cells because the ethers are more stable than with $MnO_2$ cathodes, so higher ether levels can be used. Suitable ethers include, but are not limited to, acrylic ethers such as 1,2-dimethoxyethane, 1,2-diethoxyethane, di(methoxyethyl) ether, triglyme, tetraglyme and diethyl ether; and cyclic ethers such as 1,3-dioxolane, tetra-hydrofuran, 2-methyl tetrahydrofuran and 3-methyl-2-oxazolidinone.

Specific negative electrode, positive electrode and electrolyte compositions and amounts can be adjusted to provide the desired cell manufacturing performance and storage characteristics, as disclosed, for example, in U.S. Patent Publication No. 2005/0112462 A1, which is incorporated herein by reference.

The cell can be closed and sealed using any suitable process. Such processes may include, but are not limited to, crimping, redrawing, colleting and combinations thereof. For example, for the cell illustrated in FIG. 1, a lead is formed in the can after the electrodes and insulating cone are inserted, and a gasket seal member and internal seal plate are placed on the open end of the container. The cell is supported at the bead while the gasket seal member and internal seal plate are pushed downward against the bead. The diameter of the top of the container above the bead is reduced with a segmented collar to hold the gasket seal member and internal seal plate assembly in place in a cell. After electrolyte is dispensed into the cell through the apertures in the vent bushing and internal seal plate, a vent ball is inserted into the bushing to seal the aperture in the internal seal plate. A PTC device and terminal cover are placed onto the cell and over the internal seal plate and the top edge of the container is bent inward with a crimping guide to retain the gasket seal member, cell cover, PTC device and terminal cap and complete the sealing of the open container. The above description is particularly relevant to FR6 type cells, examples of which are disclosed in further detail in U.S. Patent Publication Nos. 2005/0079413 A1 and 2005/0233214 A1, which are incorporated herein by reference. However, the invention may also be adapted to other cell sizes (e.g., FR03 and FR8D425).

EXAMPLE

In order to illustrate the industrial applicability of the present invention, vapor barrier properties of various materials were tested in relation to an all-ether based LiI electrolyte solution that can be utilized in one embodiment of the invention. To illustrate the vapor barrier properties of one commonly used material for seal members, a thermoplastic polypropylene film having a thickness of 76.2 micrometers (3 mils) was utilized as a control. An aluminum film was used as an example of a barrier layer, specifically a metallized coating layer and had a thickness of 20.32 micrometers (0.8 mil).

Wheaton 10 ml serum glass vials, each having an approximately 14.5 mm opening in internal diameter, each containing 8-ml of 0.752 molal LiI electrolyte in a 1,3-dioxolane (DIOX) and 1,2 dimethoxyethane (DME) solvent blend were used as the test vehicle for determining the resistance of the selected material to vapor transmission. The ratio of DIOX to DME for the solvent blend was 69.5:30.5 by weight. Circular discs of the control films (polypropylene) and experimental films (aluminum) each with diameters of 19.5 mm were punched out using a die set. Their thicknesses were measured (0.1 mil discrimination) using a thickness gage (Federal model 20P-10). A piece of such cut film was then placed against the seal surface of the glass vial. To ensure a good seal between the sample film and vial seal surface, a small amount of Dow Corning vacuum grease was applied evenly onto the vial seal surface before placing the sample film. A molded polypropylene gasket was then placed on the top of the film and crimp-sealed using an 11-mm aluminum seal by hand (Wheaton hand crimper). The weights of the sealed glass vials were measured after assembly at room temperature. The sealed glass vials were then placed in a Thermotron® oven set at 75° C. for storage. The weight loss of the solvent was determined by measuring the sealed glass vials at the indicated storage time.

The test results indicated that the control films had an average weight loss of 5.2398 grams (0.0396 std.) after 9 days at 75° C. and the example metallized coating layer had an average weight loss of 0.0298 grams (0.0094 std.) after 9 days at 75° C. The experiment shows the effectiveness of using a metallized coating layer in order to provide a desired level of resistance to vapor transmission.

It will be understood by those who practice the invention and those skilled in the art that various modifications and improvements may be made to the invention without departing from the spirit of the disclosed concept. The scope of protection afforded is to be determined by the claims and by the breadth of interpretation allowed by law.

What is claimed is:

1. An electrochemical cell, comprising:
 a metal container having a closed bottom end, a sidewall and an open end;
 a cell cover disposed in the open end of the container;
 a positive electrode;
 a negative electrode comprising lithium;
 a separator disposed between the positive and negative electrodes;
 a nonaqueous electrolyte comprising an organic solvent;
 a releasable vent mechanism; and
 a seal member, disposed between the container and a portion of the cell cover, comprising a thermoplastic resin body having an annular shape with a surface coating disposed on at least a portion of the resin body;
 wherein the surface coating comprises at least one selected from the group consisting of:
  i) an electrically insulating, inorganic material, and
  ii) when the container comprises a cylindrical container, the negative electrode comprises lithium and the electrolyte is a non-aqueous organic electrolyte, a metallized layer that is non-permeable to the electrolyte coated on to a portion of at least one selected from the group consisting of: a) an inner surface that is in communication with a reaction chamber defined by the container and the cell cover, wherein the reaction chamber contains the positive electrode, the negative electrode, the separator and the electrolyte, and b) an outer surface that is not in communication with the reaction chamber.

2. The electrochemical cell according to claim 1, wherein the positive electrode is coated onto a current collector, the negative electrode consisting essentially of lithium or a lithium alloy and the positive electrode, the negative electrode and the separator comprise a spirally wound electrode assembly disposed within the container.

3. The electrochemical cell according to claim 1, wherein the surface coating is a metalized layer; wherein the seal member is disposed between the container and an internal seal plate of the cell cover; and wherein (i) the metallized layer surface coating is present on a surface of the thermoplastic resin body with exception to two annular sections located at an upper and lower inner diameter portion of the thermoplastic resin body for preventing direct shorting between the container and internal seal plate; (ii) wherein the metallized layer is present on the thermoplastic resin body extending from a base of an inner diameter sidewall of a lower end of the thermoplastic resin body and upwardly along an inner portion of the thermoplastic resin body and terminating at a location below an upper end of the inner diameter sidewall so that no contact is made with a conductive portion of a conductive terminal of the cell cover; or (iii) wherein the metallized layer is present on an inner diameter sidewall of the thermoplastic resin body, and wherein an insulating coating layer is present on a portion of the metallized layer adjacent a positive temperature coefficient device and a conductive terminal of the cell cover to prevent direct contact of the metallized layer with the positive temperature coefficient device and the conductive terminal of the cell.

4. The electrochemical cell of claim 1, wherein the metallized layer, when present, has a total thickness of 1 to 25 micrometers and wherein the surface layer of electrically insulating, inorganic material, when present, has a total thickness of 5 to 30 micrometers.

5. The electrochemical cell of claim 1, wherein the metallized layer, when present, has a total thickness of 5 to 20 micrometers and wherein the surface layer of electrically insulating, inorganic material, when present, has a total thickness of 10 to 25 micrometers.

6. The electrochemical cell according to claim 1, wherein the electrically insulating, inorganic material is coated onto a portion of the thermoplastic resin body that is exposed to the electrolyte within the container.

7. The electrochemical cell according to claim 1, wherein the entire surface of the thermoplastic resin body includes the surface coating.

8. The electrochemical cell according to claim 1, wherein the seal member is a vent bushing.

9. The electrochemical cell according to claim 8, wherein the entire surface of the vent bushing includes the metalized layer.

10. The electrochemical cell according to claim 1, wherein the electrolyte comprises at least one ether compound.

11. The electrochemical cell according to claim 10, wherein the ether compound is one or more selected from the group consisting of: 1,2-dimethoxyethane, 1,2-diethoxyethane, di(methoxyethyl) ether, triglyme, tetraglyme, diethyl ether, 1,3-dioxolane, tetra-hydrofuran, 2-methyl tetrahydrofuran and 3-methyl-2-oxazolidinone.

12. The primary electrochemical cell according to claim 1, wherein the positive electrode, negative electrode and separator are a spirally wound electrode assembly.

13. The electrochemical cell according to claim 1, wherein the container is a cylindrical container, wherein the cell is a primary cell and wherein the positive electrode comprises iron disulfide.

14. The electrochemical cell according to claim 1, wherein the thermoplastic resin of the thermoplastic resin body is polyolefin, polyphenylene sulfide, polyphthalamide, polyamide, fluoropolymer, or a combination thereof.

15. The electrochemical cell according to claim 1, wherein the thermoplastic resin is polypropylene, polyphenylene sulfide, polyphthalamide, Nylon-6,6, or ethylene-tetrafluoroethylene copolymer.

16. The electrochemical cell according to claim 1, wherein the electrically insulating, inorganic material is a metal oxide, a metalloid oxide, a metal nitride, or a metalloid nitride, or a combination thereof.

17. The electrochemical cell according to claim 1, wherein the electrically insulating, inorganic material is silicon oxide, silicon dioxide, silicon nitride, aluminum oxide, aluminum nitride, or boron nitride, or a combination thereof.

18. The electrochemical cell according to claim 1, wherein the metallized layer is aluminum, an aluminum alloy, nickel, a nickel alloy, copper, a copper alloy, tin, or a tin alloy, or a combination thereof.

* * * * *